(Model.)

A. BRADLEY.
HUB FOR VEHICLE WHEELS.

No. 324,218. Patented Aug. 11, 1885.

Witnesses:-
Jas. K. McCathran.
M. P. Callan

Inventor:
Alfred Bradley
by his Atty
O. H. Rowe

UNITED STATES PATENT OFFICE.

ALFRED BRADLEY, OF DAYTON, OHIO.

HUB FOR VEHICLE-WHEELS.

SPECIFICATION forming part of Letters Patent No. 324,218, dated August 11, 1885.

Application filed December 1, 1884. (Model.)

*To all whom it may concern:*

Be it known that I, ALFRED BRADLEY, a citizen of the United States, residing at Dayton, in the county of Montgomery and State of Ohio, have invented a new and useful Improvement in Wheel-Hubs, of which the following is a description.

My invention is an improvement in wheels, and especially on the Patent No. 218,207, granted C. K. Wilcox for wagon-spoke tenons.

The invention has for an object to so form the tenon that the compression thereof will not affect its fibers, and that the expansive force of such compressed tenons will operate on the interior of the hub, and the periphery thereof will be free of strain.

To this end the invention consists in the novel construction and combination hereinafter described, and pointed out in the claims.

Figure 1:
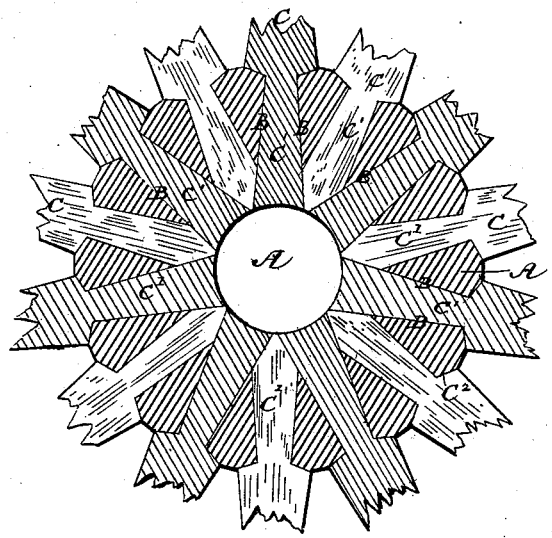
Figure 2:
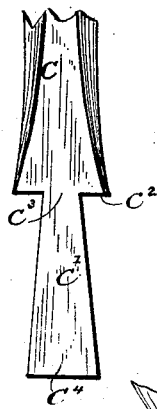
Figure 3:
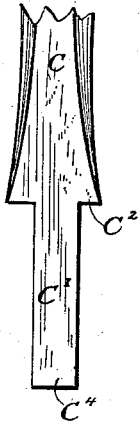
Figure 4:
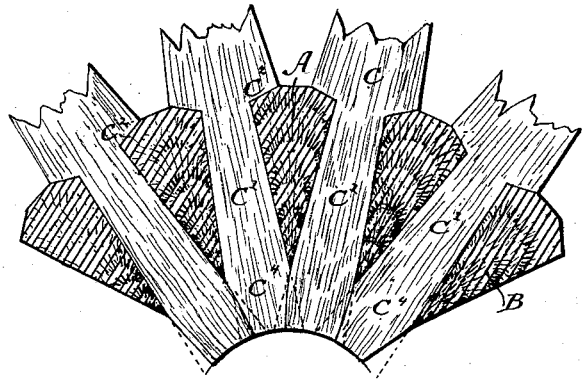

In the drawings, Figure 1 is a sectional view of a hub with spokes secured according to my invention; Fig. 2, a side view of the spoke with the tenon before it is compressed; Fig. 3, a side view of the spoke with the tenon compressed, and Fig. 4 is a detached sectional view showing the upsetting of the fibers of the hub at the interior thereof.

In practicing the Wilcox invention the tenon is grooved at its base, and it is then compressed, the sides of the tenon approaching each other in parallel planes. This compression, when the outside of the tenon at the edges of the grooves reaches the base of such grooves, drives inward the fibers extending forward from the base of such groove, shearing off the fibers and weakening the tenon at the point where the greatest strength is demanded; also, in the Wilcox invention the tenon expands equally from the groove to its extremity, producing a great strain on the periphery of the hub, which tends to split the same, and necessitates the employment of encircling bands to prevent the splitting of such hub. I overcome these objections by the construction I will now describe.

The hub A is provided with spoke-sockets B, formed from its periphery, and having their side walls parallel to each other. The spoke C is provided with a tenon, C', the neck $C^3$ of which is narrower than the extremity $C^4$, and its sides taper gradually outward in straight lines from the shoulders $C^2$ toward such extremity, as shown in Fig. 2. The neck $C^3$ of the tenon is made of equal width with the mortises B of the hub, and the end $C^4$ is normally of greater width than such mortise, for the purpose presently described. The tenon is placed in a vise or between dies, which compress its enlarged end until it can be inserted or driven fully into the mortise, after which the enlarged compressed end will expand within the mortise, and press against the opposite walls or sides of the mortise and upset and condense the fiber of the wood at the interior of the hub, securely fastening the tenon in the mortise, as will be seen. It will be noticed that by reason of the taper of the sides of the tenon the compression thereof will not crush or otherwise injure the fiber, and the gradual increase in the expansive force of the tenon toward its extremity by reason of its tapered shape will give a springiness of action not attained where an equal compression is applied to the tenon throughout its length.

In operation it will be seen that the expansive force of the tenons operates in the interior of the hub, and distant from the periphery thereof, and that the expansion of the series of tenons acting in opposition forms an arch around the center of the hub. By thus applying the expansive force at the center of the hub and relieving the periphery thereof, I obviate the cracking of the hub resulting where the walls of the spoke-sockets are expanded equally throughout their lengths. Thus it will be seen I am able, when desired, to dispense with a band encircling the hub, and provide a construction in which the compression of the tenon does not injure the fiber thereof, and in which the pressure of expansion thereof operates in the interior of the hub, and is freed from the periphery, thus avoiding the cracking of the hub, and providing a stronger wheel by reason of the strength of the tenon, and the fact that the hub-body is relieved of pressure at the periphery, and so has no tendency to crack.

Having thus described my invention, what I claim, and desire to secure by Letters Patent, is—

In a wheel, the combination of the hub-body made of wood provided in its periphery with spoke-sockets having parallel side walls, and the spokes provided with tenons having their sides tapering outward in straight lines from the base of the tenons to the extremity thereof, said tenons being compressed and inserted in the sockets of the wooden body, and held by the expansion of their extremities, whereby such expansion occurring in the interior of the hub, the splitting thereof will be prevented, substantially as set forth.

In testimony whereof I hereunto affix my signature in presence of two witnesses.

ALFRED BRADLEY.

Witnesses:
M. P. CALLAN,
WM. H. ROWE.